United States Patent [19]

Sutherland

[11] 3,748,654
[45] July 24, 1973

[54] REMOTE METER READ-OUT STATION WITH PULL-OFF COVER
[75] Inventor: Ray Sutherland, Hopwood, Pa.
[73] Assignee: Rockwell Manufacturing Co., Pittsburgh, Pa.
[22] Filed: Jan. 21, 1972
[21] Appl. No.: 219,749

[52] U.S. Cl................. 340/177 R, 174/48, 339/37, 340/188 R, 73/194 E
[51] Int. Cl............................................. G08c 19/02
[58] Field of Search ................... 340/177 R, 188 R; 73/194 E; 49/463, 465; 174/48, 58; 339/12 R, 17 C, 37, 123

[56] References Cited
UNITED STATES PATENTS
3,046,534  7/1962  Constant, Jr.................... 340/188 R
3,153,780  10/1964  Zaubi............................ 340/188 R Primary Examiner—John W. Caldwell
Assistant Examiner—Glen R. Swann, III
Attorney—William A. Strauch, James E. Nolan et al.

[57] ABSTRACT

A remote meter reading terminal housing having a terminal access opening that is closed by a removable cover. The cover is pulled off to provide access to the terminals in the housing by a magnet that is magnetically coupled to the cover by the meter reader.

27 Claims, 10 Drawing Figures

Patented July 24, 1973

Patented July 24, 1973

REMOTE METER READ-OUT STATION WITH PULL-OFF COVER

FIELD OF INVENTION

This invention relates to enclosures for a remote meter-reading terminal station and a means for providing access to signal-transmitting terminals at the remote meter-reading station.

SUMMARY AND OBJECTS OF INVENTION

Apparatus for remotely reading the registration or quantity-indicating, mechanical output of a flow meter typically includes a circuit at the meter for converting the mechanical output of the meter into electrical signals. These signals may be in analog form (such as coded d.c. voltage levels) or in digital form (such as a pulse train). The coded signals developed by the converting circuit are customarily transmitted by a suitable transmission line to read-out terminals at a remote meter read-out station, which is located at a place that is preferably conveniently accessible to the person taking the meter reading. The person taking the reading carries a portable read-out unit that comprises a signal-operated read-out device and an electrical connector which the meter reader removably plugs into the read-out device. The read-out device comprises a suitable circuit that is responsive to the coded signals to display or record the meter reading.

According to this invention, a housing, which is provided at the remote read-out station for enclosing the signal-transmitting terminals, has a terminal-access opening that is closed by a magnetic pull-off cover assembly. In the preferred embodiment of this invention the cover assembly comprises a closure member and a magnetically attractable metallic part mounted exteriorly on the closure member. The person taking the meter reading carries a magnet that he magnetically couples to the metallic part to pull off the cover. He then inserts a hand-carried signal-transmitting connector unit through the uncovered opening to make contact with the signal-transmitting read-out terminals for taking the reading of the meter. Advantageously, the magnet is mounted on a hand-carried casing that also mounts the electrically conductive, signal-transmitting connector elements. When the cover is removed it remains conveniently coupled to and thereby supported by the pull-off magnet so that after the meter reading is taken the meter reader may quickly and easily reposition the magnetically held cover assembly on the housing to close the opening. With the foregoing novel construction the cover is easily and quickly removed and re-positioned without requiring the meter reader to handle the cover or to store it while taking the meter reading. By supporting the removed cover on the magnet, the possibility of losing or misplacing the cover is reduced.

According to the preferred embodiment of this invention, the terminal-enclosing housing is formed with an outwardly opening recess or pocket, and the terminal access opening is formed in the bottom of the housing recess. The closure member of the cover assembly has a first portion that is interfittingly received in the terminal access opening and a second portion that is interfittingly received in the bottom of the outwardly opening housing recess. The exteriorly exposed portion of the cover assembly is free of any protuberances or the like that may be gripped by hand or tool. This recessed housing construction and the interfit of the closure member in the housing recess makes access to the cover by hand or tool difficult. Additionally, the lack of any exterior protuberances in the cover prevents the cover from being removed by use of the fingers or such tools as pliers. As a result, a vandal and tamper resistant construction is provided, and it retards unauthorized access to the signal-transmitting, read-out terminals in the housing.

Advantageously, an elastically deformable O-ring is carried by the closure member portion that is received in the terminal access opening to provide a fluid tight seal between the cover and the housing. In this manner a weatherproof enclosure is provided for the signal-transmitting, read-out terminals.

With the foregoing summary in mind, a major object of this invention is to provide a novel magnetically attractable, pull-off cover construction for closing the terminal access opening of a terminal-enclosing housing at a remote meter read-out station.

A more specific object of this invention is to provide a novel magnetic pull-off cover for closing the terminal access opening in a remote meter reading terminal housing and to provide a portable remote meter read-out unit with a hand-carried casing that mounts a magnet for pulling off the cover and a signal-transmitting connector means for insertion through the uncovered opening to transmit the meter signals to a signal-responsive, meter reading device in the read-out unit.

Still another object of this invention is to provide a novel remote meter reading housing and cover construction that is tamper-resistant and retards unauthorized entry.

Another object of this invention is to provide a novel weatherproof housing and cover construction for meter read-out terminals at a remote meter reading station.

Further objects of this invention will appear as the description proceeds in connection with the below-described drawings and the appended claims.

DETAILED DESCRIPTION

Figure 1:
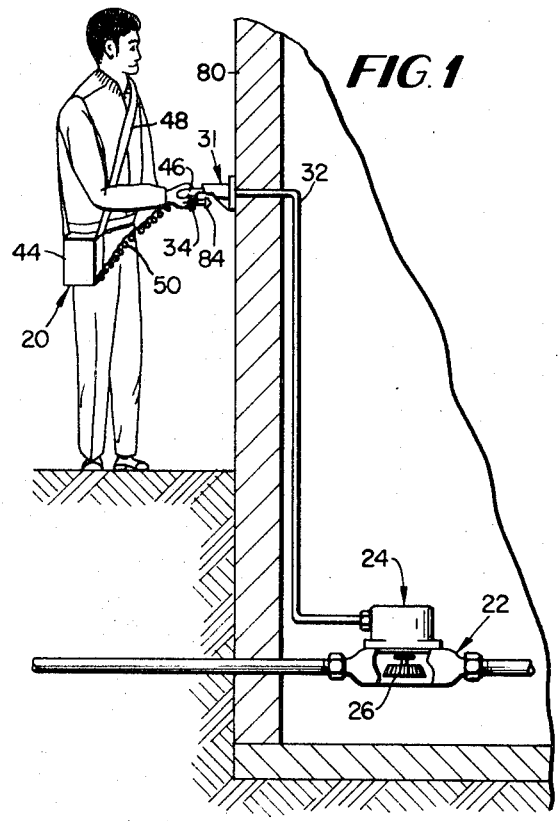
FIG. 1 is a fragmentary view of a remote meter reading apparatus incorporating the principles of this invention and showing the remote meter reading terminal housing mounted on the wall of a building for convenient access by the meter reader.
Figure 3:
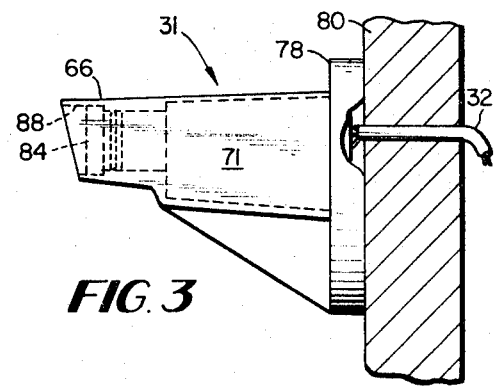
FIG. 3 is an enlarged side elevation of the remote meter reading terminal housing and cover assembly shown in FIG. 1.
Figure 4:
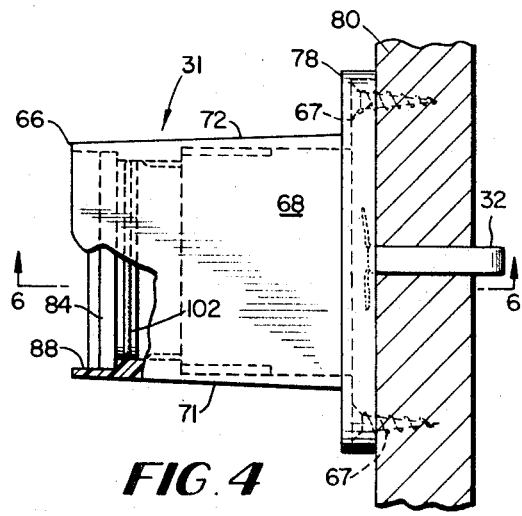
FIG. 4 is a top plan view of the remote meter reading terminal housing and cover assembly shown in FIG. 3.

Referring to the drawings and particularly to FIG. 1, a remote meter reading apparatus incorporating the principles of the invention is shown to comprise a portable unit 20 for remotely indicating the register reading of a meter 22. Meter 22 is shown to be the fluid flow type for metering fluids. Meter 22 may also be of the type for metering the flow of electrical current.

In this embodiment meter 22 may be of the type described in United States Letters Patent No. 3,534,619 issued on Oct. 20, 1970 for Register Drive Means. As shown, meter 22 comprises a register 24 which is driven by a metering rotor 26 in response to fluid flow through the meter housing.

Typically, the remote meter reading apparatus includes an electrical signal emitting circuit indicated at 28 (FIG. 2) for converting the meter register reading or more particularly the mechanical movement of the meter output into electrical signals that are indicative of the meter register reading. For purposes of this invention, circuit 28 may be of any suitable, conventional type. For example, any of the converting circuits described in the following patents may be utilized in conjunction with this invention: United States Letters Patent No. 3,069,670 issued on Dec. 18, 1962 for Remote Meter Reading System, United States Letters Patent No. 3,046,534 issued on July 24, 1962 for Remote Meter Reading Apparatus, and United States Letters Patent No. 3,228,243 issued on Jan. 11, 1966 for Fluid Flow Meter.

Figure 2:
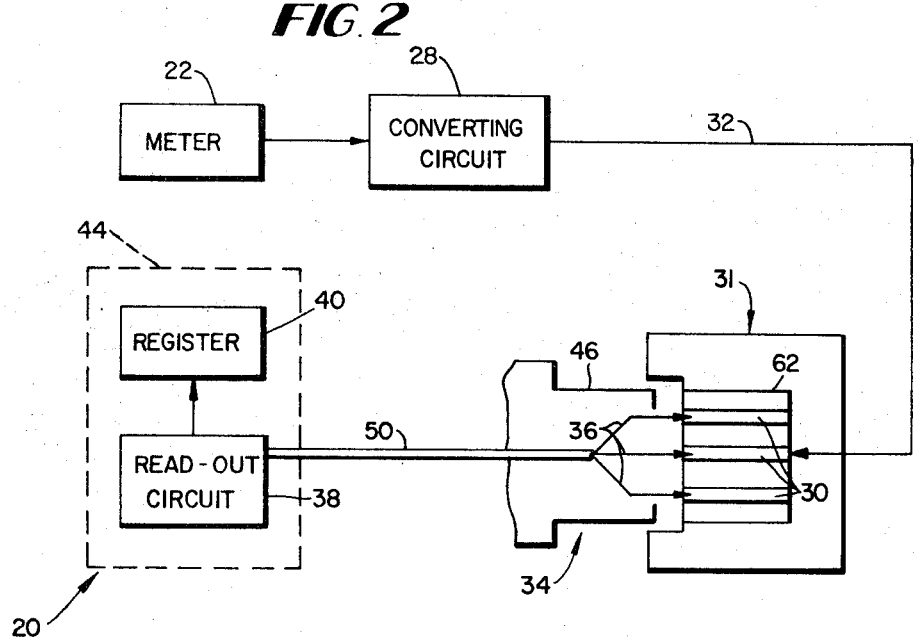
FIG. 2 is a schematic diagram of the remote meter reading apparatus shown in FIG. 1.

Referring to FIGS. 1 and 2, circuit 28 is electrically connected to read-out terminals 30 at a remote read-out station 31 by a suitable signal transmission line 32. The hand-carried plug-in gun or connector unit of this invention is indicated at 34 and has corresponding contact or connector elements 36 that are adapted to be detachably connected to terminals 30 by the person taking the meter reading to complete a circuit between converting circuit 28 and a read-out circuit 38 in unit 20. Unit 20 further includes a suitable indicating device such as a register 40 that is operated by circuit 38 to provide a reading of the meter registration. Unit 20 may alternatively or additionally include any other suitable indicating device such as a recorder for recording the meter registration. It will be appreciated that the meter registration constitutes the mechanical, quantity-indicating output of meter 22.

Circuit 38 may be of any suitable type that is compatible with converting circuit 28. For example, circuit 38 may be the same as that shown in any one of the previously identified U.S. Pat. Nos. 3,046,534, 3,228,243 and 3,060,670. Circuit 38 is responsive to the signals supplied by circuit 28 to cause register 40 or other suitable indicating device to provide an indication of the quantity that is registered by register 24. Circuit 28 and read-out unit 20 alternatively may be the same as the remote meter reading apparatus described in pending application Ser. No. 219,748 filed on Jan. 21, 1971 and assigned to the assignee of this application.

In the illustrated embodiment, plug-in gun 34 and read-out unit 20 have separate casings which are respectively indicating at 46 and 44 in FIGS. 1 and 2. Casing 44 houses register 40 and circuit 38. A shoulder strap 48, which is secured to casing 44, enables unit 20 to conveniently be carried by the meter reader as shown in FIG. 1. Contact elements 36 are connected to circuit 38 by a suitable flexible electrical signal transmitting cable 50.

Plug-in gun 34 is adapted to be carried in the hand of the meter reader as shown in FIG. 1 so that it can conveniently be plugged into the remote read-out station 31 to detachably engage contact elements 36 with terminals 30 for completing a circuit between circuits 28 and 38.

Figure 10:
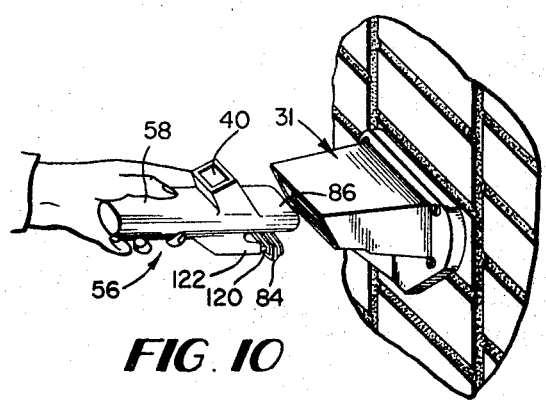
FIG. 10 is a perspective view similar to FIG. 8, but showing an alternate embodiment in which a register, the plug-in connector elements and the cover-pulling magnet are all mounted by a single hand-carried casing.

Alternatively, the components of gun 34 and unit 20 may be combined into a single hand-carried unit 56 as shown in FIG. 10. Unit 56 has a casing 58 that mounts contact elements 36, circuit 38 and register 40. Casing 58 and the operative meter reading parts housed by casing 58 may be the same as that shown in the previously identified U.S. Pat. No. 3,228,243.

As shown in FIG. 2, terminals 30 may be in the form of printed terminals strips on a printed circuit card 62. Contact elements 36 are in the form of terminal strip connectors for engaging the printed terminal strips on card 62 when gun 34 is plugged into read-out station 31.

Referring to FIGS. 3-7, read-out station 31 is provided with a regid, hollow two-part housing 66 that is fixed to the wall of a building or other support structure by screws 67 (FIG. 5) or other suitable fastening elements. Preferably, housing 66 is mounted in a place that is conveniently accessible to the meter reader such as the outside wall of a building in which meter 22 is located. Housing 66 may be formed from any suitable material and advantageously is fabricated from a suitable electrical insulating plastic material.

Still referring to FIGS. 3-7, housing 66 is formed with top and bottom walls 68 and 69, a separable rear wall 70, spaced apart side walls 71 and 72 extending between the top and bottom walls 68 and 69, and an apertured forward end wall 73. Walls 68–72 define a cavity or socket 74 (FIG. 6) in which circuit card 62 is mounted. Card 62 is fixed to housing 66 in any suitable manner, and the printed circuit terminal strips on card 62 are electrically connected to terminal pins 76 (one shown in FIG. 6) that are mounted in a recessed region on back wall 70. The conductors of transmission line 32 are connected to terminal pins 76 as shown.

Housing 66 is formed with a flange 78 that is adapted to seat against building wall or other support structure which is indicated at 80 in the drawings. Back wall 70 is formed separately of the remainder of housing 66 and is rigidly fixed to the house wall 80 by screws 67. An elastically deformable gasket 79, that is seated in a groove in back wall 70, and is deformed against the remaining housing part 79a to provide a fluid tight seal between part 79a and wall 70. Screws 67a extend through apertures in flange 78 to detachably secure housing part 79a to back wall 70.

Wall 70 is seated in a recessed region of flange 78, and this recessed region opens rearwardly toward wall 80 as shown. From the foregoing, it will be seen that the read-out station is usually installed by connecting the leads of transmission line 32 to the terminal pins 76 and back wall 70 is then secured by screws 67 to the building wall 80. As shown, printed circuit card 62 may advantageously be cantilevered from, and hence mounted by, back wall 70. The remainder of housing 66 namely part 79a is then fitted over back wall 70, with gasket 79 in place, and is secured to back wall 70 by screws 67a. Screws 67a may then be sealed by any of the conventional tamper detection methods, such as a seal wire (not shown). As shown, flange 78 peripherally surrounds back wall 70 so that unauthorized access to wall 70, screws 67 and pins 76 is prevented when housing 66 is mounted on wall 80 as shown. It will be appreciated from the foregoing that back wall 70 is mounted on wall 80 and housing part 79a, in turn, is mounted on back wall 70 independently of the mounting of back wall 70 on wall 80.

Figure 6:
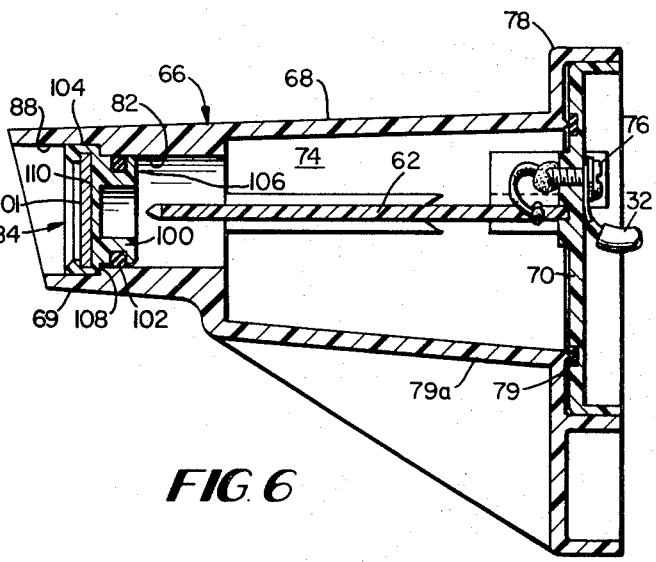
FIG. 6 is a section taken substantially along lines 6—6 of FIG. 4.
Figure 8:
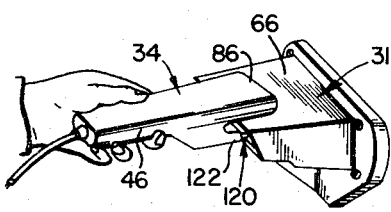
FIG. 8 is an enlarged perspective view illustrating the manner in which the hand-carried connector unit of FIG. 1 is positioned for magnetically pulling off the cover at the remote read-out station.
Figure 7:
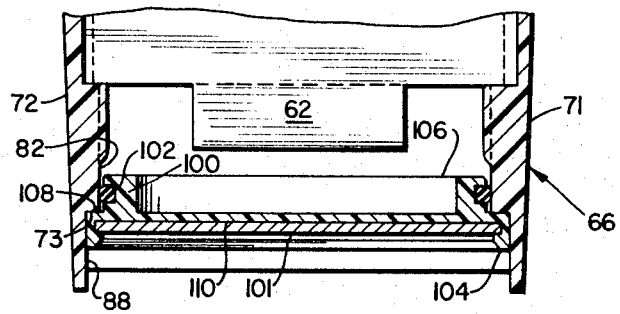
FIG. 7 is a section taken substantially along lines 7—7 of FIG. 5.
Figure 9:
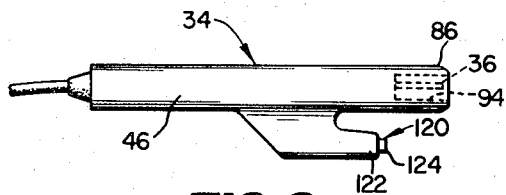
FIG. 9 is a side elevation of the hand-carried connector unit shown in FIGS. 1 and 8.

As best shown in FIGS. 6 and 7, the forward housing end wall oposite from back wall 70 is formed with a recessed opening 82 that is closed by a removable cover assembly 84. Casing 46 is formed with a nose portion 86 (FIG. 8) that the person taking the meter reading inserts through opening 82 and into socket 74 after cover assembly 84 is removed. Contact elements 36 are disposed in nose portion 86 (see FIG. 9) to contact terminals 30 upon insertion of nose portion 86 into cavity 74.

As best shown in FIG. 6 the forward ends of walls 68, 69, 71 and 72 extend beyond wall 73 at the open end of housing 66 to define an outwardly opening recess 88 for receiving nose portion 86. End wall 73 forms the bottom of recess 88. Walls 68, 69, 71 and 72 are interiorly stepped to form end wall 73 as a shoulder that peripherally surrounds opening 82 between recess 88 and cavity 74. Opening 82 is elongated transversely of the direction in which nose portion 86 is inserted into cavity 74. Nose portion 86 and housing 66 may be so dimensioned that the interior housing wall surfaces that define opening 82 and recess 88 matingly and slidably receive nose portion 86 to guide contact elements 36 into proper contact with terminals 30. Contact elements 36 are received in an outwardly opening recess 94 (FIG. 9) that is formed in nose portion 86.

As best shown in FIGS. 6 and 7 cover assembly 84 is a three part construction and comprises a rigid closure member 100, a flat-sided, magnetically attractable metal plate 101 and a resilient 0-ring 102. Member 100 is preferably formed from a suitable electrical insulating plastic material.

Still referring to FIGS. 6 and 7, closure member 100 is integrally formed with a rectangular portion 104 and an protuberant boss-like portion 106 that extends rearwardly from the inner or back face of portion 104. The stepped juncture between portions 104 and 106 provides portion 104 with a flat rearwardly facing shoulder surface 108 that peripherally surrounds portion 106. When cover assembly 84 is mounted in place on housing 66, portion 104 is interfittingly and slidably received in recess 88, and shoulder surface 108 overlies and seats against the opposing, outwardly directed face of end wall 73. Portion 106 is slidably and interfittingly received in opening 82 and is formed with an outwardly opening circumferential groove that seats 0-ring 102. 0-ring 102 is thus carried by portion 106 and is deformed against the interior wall surfaces defining opening 82 to provide a fluid tight seal between closure member 100 and housing 66. Housing 66, when mounted on wall 80 or other structure, is constructed to permit access to the interior thereof only through opening 82, and except for the small apertures interfittingly receiving terminal pins 76 and opening 82, the cavity-defining walls of housing 66 are otherwise imperforate. Cover assembly 84 thus cooperates with housing 66 to provide a weatherproof enclosure for the portions of the circuit in cavity 74. Cover assembly 84 is held in its opening-closing position on housing 66 only by frictional engagement with the interior housing surfaces.

Figure 5:
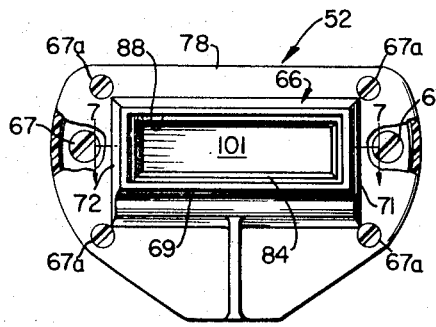
FIG. 5 is a front elevation of the remote meter reading terminal housing and cover assembly shown in FIG. 3.

Stil referring to FIGS. 6 and 7, portion 104 is recessed at 110 to interfittingly receive plate 101. Plate 101 is fabricated from any suitable magnetically attractable metal and is securely fixed to closure member 100 by suitable means. As shown in FIG. 5, plate 101 may serve as a name or identification plate.

Cover assembly 84 is removed by a permanent bar magnet 120 (FIGS. 8 and 9) which is fixedly mounted on a further nose portion 122 of casing 46. Magnet 120 is thus carried by gun 34, and it protrudes forwardly from nose portion 122 as shown. Nose portion 122 is spaced from nose portion 86 and the other regions of casing 46 to permit the person taking the meter reading to butt a protruding flat pole face 124 (FIG. 9) of magnet 120 against plate 101. In this manner, plate 101 will be magnetically coupled to magnet 120 so that by pulling gun 34, cover assembly 84 will be pulled away from housing 66, and it will remain magnetically attached to magnet 120 (see FIGS. 1 and 10) at a position on gun 34 that does not interfere with the use of gun 34 to complete the circuit connections for reading the registration or output of meter 22.

In the illustrated embodiments, magnet 120 and nose portion 122 are spaced below nose portion 86, although it will be appreciated that magnet 120 may be located in any other convenient place on the hand-carried unit where it does not interfere with the use of meter reading apparatus for taking a meter reading.

From the foregoing it will be appreciated that in order to take a meter reading, the meter reader first butts magnet 120 against plate 101 to remove cover assembly 84 from housing 66. Cover assembly 84 will thus be held and supported by magnet 120 so that the meter reader does not have to handle or temporarily store the cover assembly while taking the meter reading. After cover assembly 84 is removed, the meter reader inserts nose portion 86 into opening 82 to engage contact elements 36 with terminals 30, thereby making the circuit connections between circuits 28 and 38. The meter reader then activates unit 20 to remotely read the registration of meter 22.

After the meter reading is taken, the meter reader positions gun 34 to insert nose portion 122 and the magnet-carried cover assembly in recess 88 and then pushes forwardly on gun 34 to push cover assembly 84 back into opening 82. After cover assembly 84 is in place, the meter reader detaches magnet 120 from the cover assembly by turning gun 34 to twist magnet 120 away from plate 101. The snug fit of cover assembly 84 in housing 66 and particularly the snug engagement of 0-ring 102 with the interior wall surfaces of housing 66 provides sufficial frictional resistance to permit magnet 120 to be twisted free of plate 101 without pulling out or dislodging the cover assembly. However, the frictional resistance offered by the cover assembly is not so great as to overcome the magnetic attraction of magnet 120 to effectuate the removal of the cover assembly by applying a pulling force axially of the magnet.

With cover assembly 84 mounted in place on housing 66, cover portion 104, which is received in recess 88, slidably and closely interfits with the recess-defining portions of walls 68, 69, 71 and 72 with a relatively small clearance. There are no exteriorly exposed parts or projections on cover assembly 84 that can be gripped by the fingers or a tool, such as pliers, to facilitate the removal of the cover assembly. Also, cover assembly 84, when positioned in its closing position has no parts or portions extending outwardly beyond recess 88. Furthermore, the clearance between portion 104 and the recess-defining wall portions of housing 66 is sufficiently small to prevent implements such as screwdrivers from being inserted between the housing walls and portion 104 to pry cover assembly 84 out. Without the use of a magnet, cover assembly 84 is therefore very difficult to remove without being marred or without unconcealable destruction. Thus the enclosure construction according to this invention is tamper and vandal resistant and retards unauthorized entry and access to the remote meter read-out terminals. In addition, access to terminal pins 76 and the conductor connections thereto is prevented when housing 66 is mounted on wall 80 or other suitable support structure in the manner shown.

To the extent that unit 56 is the same as gun 34, like reference characters have been applied to designate like parts and portions. As shown in FIG. 10, nose portions 86 and 122 of unit 56 respectively mount the connector elements 36 and magnet 120 in the manner just described for the previous embodiment. Unit 56 is hand-carried, and cover assembly 84 is removed and re-positioned in its closing position in the same manner as described for the previous embodiment.

What is claimed and desired to be secured by Letters Patent is:

1. In combination with a remote flow meter read-out station adapted to be located remotely from a flow meter whose reading is to be taken and having terminal means to which electrical signals representing the output of said meter are supplied, a housing receiving said terminal means and having an opening to provide access to said terminal means, pull-off cover means removably mounted on said housing and closing said opening, a portable meter reading apparatus adapted to be carried by a person taking the meter reading and comprising hand-carried casing means, connector means mounted by said casing means for manual insertion through said opening and engagement with said terminal means upon removal of said cover means to transmit said signals, means for receiving the signals transmitted by said connector means and being responsive to said signals to provide an indication of said meter output, said cover means having magnetically attractable metallic means, and magnetic means adapted to be magnetically coupled to said metallic means by the person taking the meter reading for pulling said cover means off said housing.

2. The combination defined in claim 1, wherein said magnetic means comprises a magnet positioned on said casing means.

3. The combination defined in claim 2, wherein said magnet is fixed on said casing means at a region that is spaced from said connector means.

4. The combination defined in claim 2, wherein said apparatus comprises further casing means formed separately of said hand-carried casing means and mounting said signal-responsive means.

5. The combination defined in claim 2, wherein said signal-responsive means is mounted in said hand-carried casing means.

6. The combination defined in claim 2, wherein said cover means is exteriorly free of protuberances that are manually grippable for pulling said cover means off said housing without use of said magnet.

7. The combination defined in claim 2, wherein said housing is formed with an outwardly opening recess, wherein said opening is formed in the bottom of said recess, and wherein said cover means has an exteriorly exposed portion interfittingly received in said recess.

8. The combination defined in claim 2, wherein said cover means further includes a closure member for said opening, and wherein said metallic means comprises a part positioned on the exterior of said closure member.

9. The combination defined in claim 8, wherein said closure member is formed from electrical insulating material.

10. The combination defined in claim 8, wherein said housing is formed with an outwardly opening recess, wherein said opening is formed in the bottom of said recess, and wherein said closure member has a first portion interfittingly received in said opening and a second portion interfittingly received in said recess exteriorily of said opening.

11. The combination defined in claim 10, comprising elastically deformable means carried by said first portion and deformed between said first portion and said housing to provide a seal between said housing and said closure member.

12. The combination defined in claim 2, wherein said cover means is retained on said housing only by frictional engagement with wall surfaces of said housing.

13. The combination defined in claim 1, wherein said cover means is exteriorly free of protuberances that are manually grippable for pulling said cover means off said housing without use of said magnetic means.

14. The combination defined in claim 1, wherein said housing is formed with an outwardly opening recess, wherein said opening is formed in the bottom of said recess, and wherein said cover means has a portion interfittingly received in said recess exteriorly of said opening.

15. The combination defined in claim 1, wherein said cover means comprises a closure member for said opening, wherein said housing is formed with an outwardly opening recess, wherein said opening is formed in the bottom of said recess, wherein said closure member has a first portion interfittingly received in said opening and a second portion interfittingly received in said recess exteriorly of said opening, and wherein said metallic means comprises a part fixed on an exterior face of said second portion.

16. In combination with a remote flow meter read-out station adapted to be located remotely from a flow meter whose reading is to be taken and having terminal means to which electrical signals representing the output of said meter are supplied, a housing receiving said terminal means and having an opening to provide access to said terminal means, pull-off cover means removably mounted on said housing for closing said opening and comprising a magnetically attractable metallic part, a portable meter reading apparatus adapted to be carried by a person taking the meter reading and comprising a hand-carried casing, electrically conductive, signal-transmitting connector means mounted by said casing for manual insertion through said opening and engagement with said terminal means upon removal of said cover means, and a magnet mounted on said casing and being manually positionably to be magnetically coupled to said metallic part for enabling the person taking the meter reading to pull said cover means off said housing.

17. The combination defined in claim 16, wherein said cover means is supported by said magnet upon magnetically coupling said magnet to said part and pulling said cover means off said housing.

18. In a remote meter reading apparatus for remotely reading the quantity-indicating output of a flow meter, means for converting the output of said meter into electrical signals, a meter read-out station located remote from said converting means and including terminal means, conductor means interconnecting said converting means and said terminal means for transmitting said signals to said terminal means, a portable meter read-out unit including electrically conductive connector means for selectively and detachably contacting said terminal means for transmitting said signals, means for receiving the signals transmitted by said connector means and being responsive to said signals to provide an indication of said meter output, and a housing receiving said terminal means and being formed with an opening to provide access to said terminal means, said connector means being manually insertable through said opening to contact said terminal means, the improvement comprising pull-off cover means removably mounted on said housing for closing said opening and comprising a magnetically attractable metallic part, and magnet means adapted to be magnetically coupled to said metallic means by the person taking the meter reading for pulling said cover means off said housing.

19. The remote meter reading apparatus defined in claim 18, wherein said unit further includes a hand-carried casing mounting said connector means and said magnet means.

20. The remote meter reading apparatus defined in claim 19, wherein said unit includes a further casing formed separately of said hand-carried casing and mounting said signal responsive means.

21. The remote meter reading apparatus defined in claim 19, wherein said signal responsive means is mounted in said hand-carried casing.

22. In combination, a remote flow meter read-out station adapted to be located remotely from a flow meter whose reading is to be taken and having a card that is provided with terminal means to which electrical signals representing the output of said meter are supplied, and a hollow housing receiving said card and having a back wall formed separately of the remainder of said housing and mounting said card, means detachably securing said remainder to said back wall, said remainder being formed with an opening opposite from said back wall to provide access to said terminal means, and cover means removably mounted on said remainder for closing said opening.

23. The combination defined in claim 16, wherein wherein said terminal means comprises electrical conductive strips printed on said card.

24. The combination defined in claim 22 wherein a portion of said remainder is formed with a recess, and wherein said back wall is separably seated in said recess.

25. The combination defined in claim 22 wherein said back wall is adapted to be mounted on a wall structure, and wherein said remainder is formed with a portion that peripherally surrounds said back wall and has a recess that opens toward said wall structure and receives said back wall.

26. The combination defined in claim 25 comprising terminal elements extending through said back wall and adapted to be connected to an electrical signal transmission line exteriorly of said housing, said elements being electrically connected to said terminal means in said housing.

27. The combination defined in claim 25 wherein said securing means comprises fastener means engaging said portion and said back wall to detachably fix said remainder to said back wall independently of the mounting of said back wall on said wall structure.

* * * * *

UNITED STATES PATENT OFFICE
CERTIFICATE OF CORRECTION

Patent No. 3,748,654                              Dated  July 24, 1973

Inventor(s) Ray Sutherland

It is certified that error appears in the above-identified patent and that said Letters Patent are hereby corrected as shown below:

Column 6, line 7, change "Stil" to --Still--.

Column 10, line 18 (claim 23) "16" should be --22--.

Signed and sealed this 26th day of February 1974.

(SEAL)
Attest:

EDWARD M. FLETCHER, JR.                C. MARSHALL DANN
Attesting Officer                      Commissioner of Patents